United States Patent [19]

Maas et al.

[11] Patent Number: 5,157,751
[45] Date of Patent: Oct. 20, 1992

[54] FIBER OPTIC SPLICE PROTECTOR AND METHOD FOR MAKING SAME

[75] Inventors: Steven J. Maas, Simi Valley; A. Douglas Meyer, West Hills, both of Calif.

[73] Assignee: Litton Systems, Inc., Beverly Hills, Calif.

[21] Appl. No.: 822,024

[22] Filed: Jan. 14, 1992

[51] Int. Cl.$^5$ .............. G02B 6/26; C03C 25/02; B29D 11/00

[52] U.S. Cl. .................. 385/99; 385/98; 385/95; 385/96; 65/3.1; 65/3.44; 65/56; 264/1.1; 264/1.5

[58] Field of Search .......... 385/95, 96, 97, 98, 385/99, 70; 65/3.1, 3.11, 3.44, 3.4, 36; 264/1.1, 1.5, 2.5, 2.7

[56] References Cited

U.S. PATENT DOCUMENTS

| | | | |
|---|---|---|---|
| 4,178,067 | 12/1979 | Johnson et al. | 385/95 |
| 4,325,607 | 4/1982 | Carlsen | 385/70 |
| 4,404,010 | 9/1983 | Bricheno et al. | 385/99 |
| 4,537,468 | 8/1985 | Degoix et al. | 385/99 |
| 4,544,231 | 10/1985 | Peterson | 385/96 |
| 5,022,735 | 6/1991 | Dahlgren | 385/99 |
| 5,081,695 | 1/1991 | Gould | 385/99 |
| 5,085,494 | 2/1992 | Wesson et al. | 385/99 |

Primary Examiner—Brian Healy
Attorney, Agent, or Firm—James F. Kirk; M. Michael Carpenter; Harold E. Gillmann

[57] ABSTRACT

A protected fiber optical splice and a method for making the protected splice. The protective structure encapsulates first and second spliced optical fibers. The fibers are preferably fusion spliced. The protective structure includes a rigid tube surrounding the splice and its adjacent regions of the spliced fibers. A plastic such as an epoxy or moldable plastic is injected into the tube between the substantially axially centered fibers and splice, and the interior wall of the tube. Two molding fixtures are preferably surrounding the two ends of the tube, for injecting the moldable plastic into the tube and for shaping the portions of the structure external to the the tube ends.

26 Claims, 2 Drawing Sheets

FIBER OPTIC SPLICE PROTECTOR AND METHOD FOR MAKING SAME

BACKGROUND OF THE INVENTION

This invention pertains to a protector for fiber optic splices. It also pertains to the method for making the protector, and the fixtures used with that method.

Frequently the splice is positioned in a chemically hostile environment, and it must be protected. For example, in an optical towed array it is not unusual to immerse the spliced fiber in petroleum based fluids belonging to the isoparafin family, or castor oil derivatives such as Lubricin, subjected to a few thousand (for example, up to 3000) psi at a temperature as high as 80 degrees centigrade.

The breaking strength of the unprotected optical fiber is rapidly degraded. A typical breaking strength of spliced fiber is between 15% and 20% of the breaking strength of the unspliced fiber.

To protect the splice, prior art uses a commercial telecommunication type heat shrink splice protection with a steel rod positioned along the fiber and a heat shrink tube surrounding both the fiber and the steel rod. An alternate protector uses a flexible plastic such as Teflon or Nylon tube filled with an ultra-violet-curable adhesive surrounding the spliced region, adjacent bare fiber and jacket material.

BRIEF DESCRIPTION OF THE INVENTION

The apparatus and method of this invention protects the splice from the environment, re-establishes the integrity of the fiber jacket, and strengthens the splice until it has a sustained breaking strength of about 90% of the breaking strength of an unspliced fiber.

The spliced optical fiber is inserted into a rigid tube which is held by a fixture, and an epoxy or moldable plastic is injected into the fixture and tube. The epoxy or moldable plastic is then cured according to the manufacturer's recommendations.

It is therefore an object of this invention to protect fiber optical splices.

To that end, the splice is encapsuled within an epoxy which is within a rigid, preferably metal, tube.

It is also an object of this invention to provide a method for making the optical splice protector.

It is likewise an object of this invention to provide a novel fixture for use with that method.

Other objects will become apparent from the following description, taken together with the accompanying drawings.

DETAILED DESCRIPTION OF A PREFERRED EMBODIMENT

Figure 1:
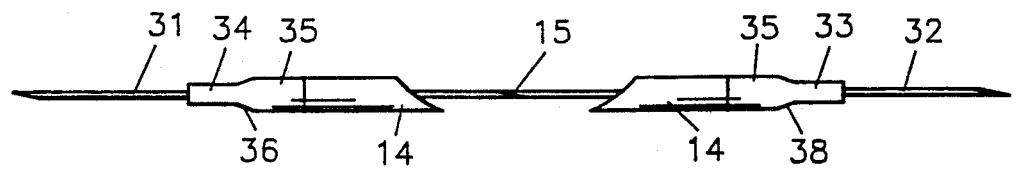
FIG. 1 is a partly broken view of the encapsulating fiber optic splice protector of this invention.

The splice protector of this invention is shown, partly broken away, in FIG. 1. A rigid metal tube 14 of, for example, copper, steel, Invar or aluminum surrounds the splice 15 and its adjacent optical fibers 31 and 32. Cured plastic material such as a urethane 35 surrounds the fibers 31 and 32 within the tube 14. The urethane 35 extends beyond the ends of the length of the tube 14, and it tapers at 36 and 38 to relieve any bending stress and to reduce the shearing of the fibers 31 and 32.

Figure 4:
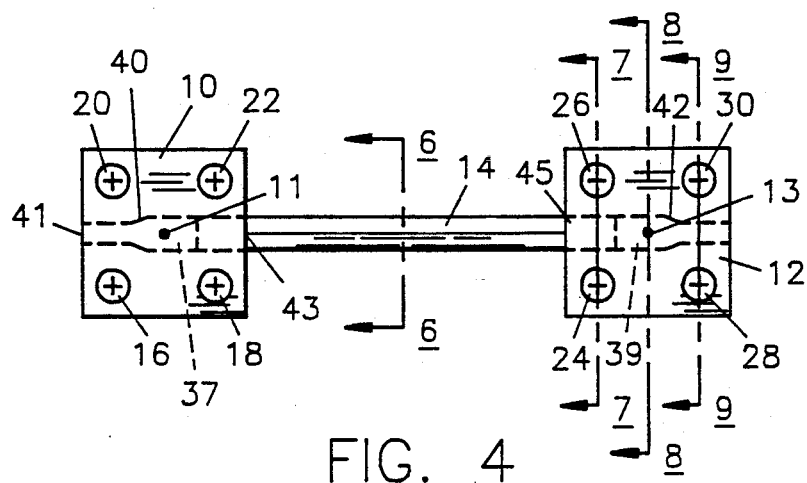
FIG. 4 is a sectional view of the fixture of the invention, holding a protecting sleeve of the invention ready for insertion of the spliced optical fiber and the injection of the epoxy.
Figure 5:
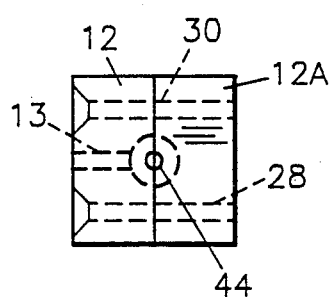
FIG. 5 is a view taken from the right in FIG. 4.
Figure 6:
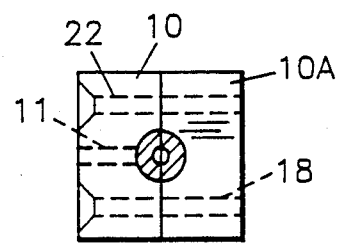
FIG. 6 is a view taken at 6—6 in FIG. 4.
Figure 7:
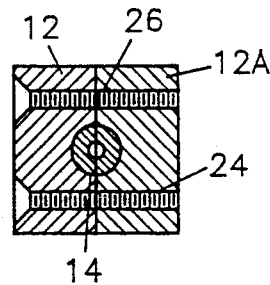
FIG. 7 is a view taken at 7—7 in FIG. 4.
Figure 8:
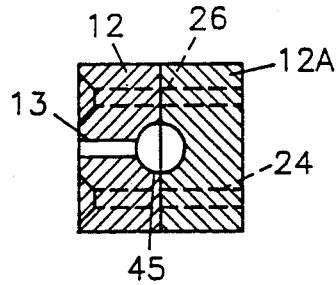
FIG. 8 is a view taken at 8—8 in FIG. 4.
Figure 9:
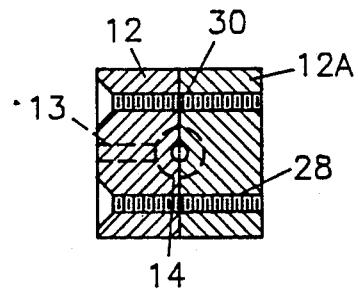
FIG. 9 is a view taken at 9—9 in FIG. 4.

In FIG. 2, 4–9, two-piece fixtures 10, 10A and 12, 12A are clamped to the ends of the tube 14. The two pieces 10, 10A and 12, 12A of the fixtures are clamped together by the screws 16–30. Openings 11 or 13 receives a hypodermic needle or similar injection nozzle (not shown) for injection of the epoxy or moldable plastic. Air is exhausted out of the other opening 13 or 11. As shown in FIG. 4, the opening 43 in fixture 10, 10A, and the opening 45 in fixture 12, 12A, enclose the ends of rigid tube 14. The opening 43 tapers at 40 to a smaller diameter opening 41 to form the taper 36 and the coating 34 of the fiber 31. Similarly, the opening 45 tapers at 42 to a smaller diameter opening 44 to form the taper 38 and the coating 33 of the fiber 32.

The two parts 10 and 10A are first loosely screwed together by screws 16, 18, 20 and 22. The rigid tube 14, usually of metal, is inserted a predetermined distance into the opening 43, and the screws 16, 18, 20 and 22 are tightened around the tube 14.

Similarly the parts 12 and 12A are first loosely screwed together by screws 24, 26, 28 and 30. The other end of the rigid tube 14 is inserted a predetermined distance into the opening 45, and the screws 24, 26, 28 and 30 are tightened around the tube 14.

Figure 2:
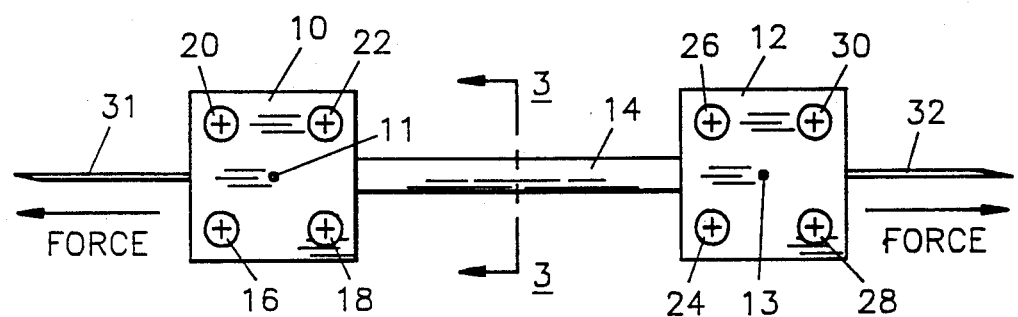
FIG. 2 is a view of the fixture of this invention, holding the rigid tube of the fiber optic splice protector of the invention.
Figure 3:
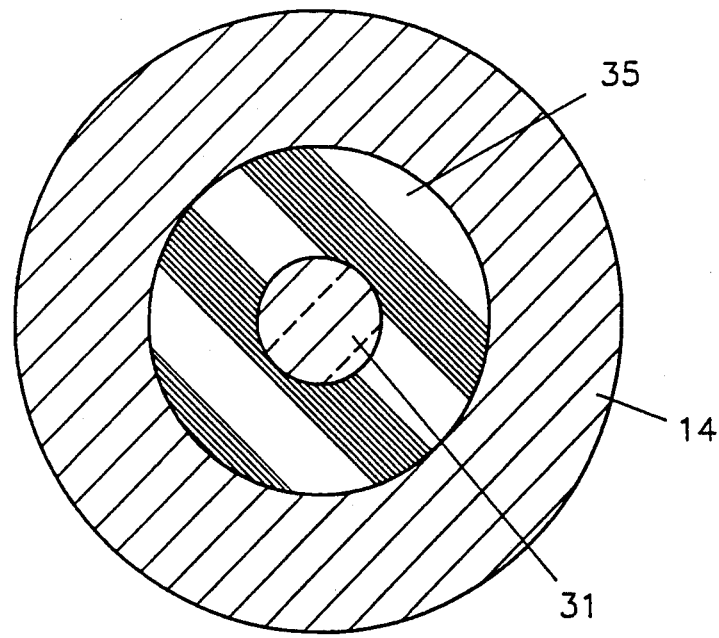
FIG. 3 is a sectional view taken at 3—3 in FIG. 2.

In some cases, the fibers 31 and 32, spliced at 15, shown in FIGS. 1 and 2, are threaded into the opening 41, through the opening 43, through the tube 14, through the opening 45 and out of the opening 44. In a preferred embodiment, the fibers are inserted through the openings 41, 43, the tube 14, and the openings 45, 44 before the splice is made. In many situations, the splice cannot first be made and the protection then slipped onto the fiber. The splice 15 is preferably substantially centered within the tube 14 between the fixtures.

Alternatively, the fiber 32 may be threaded through the tube 14 before the tube is inserted into the fixtures 10, 10A and 12, 12A. The openings 41 and 44 are slightly larger in diameter than the fiber 32 to allow forming of the coatings 34 and 33. As shown in FIGS. 4–9, because the fixtures 10, 10A and 12, 12A are split, the fiber would then lie in the regions 37, 40, 39,42 between the ends of the tube 14 and the openings 41, 44, respectively. Preferably the fiber is inserted before the splice is made.

Before the insertion of the epoxy or moldable plastic into the fixtures 10, 10A and 12, 12A, the spliced fiber 32 is preferably pulled, by applying axial force, into a taut and axially centered position within the bores 41, 40, 37, 43, 14, 45, 39, 42, and 44.

Epoxy or moldable plastic in its flowing uncured form is inserted by a hypodermic needle or similar nozzle (not shown) into one of the openings 11 or 13. It should not be inserted into both openings simultaneously because an air bubble might be formed in the fixtures or the tube 14. Assume the epoxy or moldable plastic is injected through opening 11. To prevent air entrapment or bubble formation, injection is at a slow steady pace. Opening 13 then vents out the air as the epoxy or moldable plastic fills the tube and fixtures. The epoxy or moldable plastic fills the clearance around the splice 15 and the centered fibers 31 and 32 to form the fiber coating 34, 36, 35, 38, 33 of the fibers. It fills the regions 37, 40, and 41 to form the tapered region 36 around the fiber 31. It fills the tube 14 into the fixture 12, 12A and into the tapered region 42 and the opening 44. This process forms the coating 34, 36, 35, 38, 33 around the fibers 31 and 32. Some of the epoxy or moldable plastic ascends through the vent opening 13, showing the operator that the tube 14 and the fixtures are full.

The filled fixture and tube are next cured, usually by heating them to the required temperature for the required time.

After the epoxy or moldable plastic is cured, the screws 16-30 are removed, and the parts 10 and 12 are separated from the cured epoxy. To facilitate the removal of the fixtures, the interiors of the fixtures are coated with a releasing agent before assembly.

After removal of the fixtures, the columns of cured epoxy which were cured within the openings 11 and 13 stand as columns extending radially from the coated fiber. Those columns may be cut off or otherwise removed to complete the fabrication of the coated fiber and fiber splice. Any excess epoxy or moldable plastic resin at the ends of the regions 34 and 33, extending beyond the fixtures, may be removed either before or after curing of the epoxy or moldable plastic.

There is thus formed a protected optical fiber splice having a covering 34, 36, 35, 38, 33 made of moldable plastic around the splice 15 and its adjacent fibers 31 and 32. The plastic covering is usually epoxy or moldable plastic, and it may be urethane. The portion of the covering surrounding the splice, and as much of the adjacent covering as desired, is enclosed in a rigid, preferably metal, tube 14. To relieve bending stress in the fiber, the diameter of the coating is tapered at 36 and 38, outside of the tube 14, to a diameter slightly larger than the fiber diameter.

The material of the rigid tube 14 is preferably a metal such as aluminum or steel, but other metals which do not chemically react with the plastic material or the expected environment may be used.

There is thus described a protective structure for a fiber optical splice, usually a fusion splice, together with a method for making such structure and fixtures used in that method.

The invention is not to be limited by the above description alone, but only together with the accompanying claims.

We claim:

1. A protected fiber optical splice, comprising:
   two pieces of optical fiber spliced together, with a moldable plastic encapsulating the splice and adjacent portions of said two optical fibers;
   a rigid tube surrounding said moldable plastic encapsulating said splice and at least a portion of said moldable plastic surrounding said adjacent portions of said two optical fibers;
   said moldable plastic filling all void space within said rigid tube and extending beyond said rigid tube along said fibers to form a strain relief supported by said tube.

2. A protected fiber optical splice as recited in claim 1 in which said plastic covering is of a cured epoxy or moldable plastic material.

3. A protected fiber optical splice as recited in claim 1 in which said plastic material further extends along said fibers from said tube and tapers to smaller diameters surrounding said fibers.

4. A protected fiber optical splice comprising:
   two pieces of optical fiber, each optical fiber having an optical core surrounded by jacketed cladding, each optical fiber having a respective end portion stripped of jacket and cladding to expose a short length of unclad optical core extending from cladded optical fiber, an end of each said optical core being co-axially aligned and fusion spliced together to form a continuous fiber optical guide;
   a rigid tube of metal having a bore and first and second ends, said continuous fiber optical guide being positioned in the bore of said rigid tube, said tube extending to cover said fusion splice with said ends being positioned to correspond in location with jacketed cladded portions of said optical fibers;
   a void free moldable plastic covering encapsulating the fusion splice, adjacent portions of said unclad optical core, and filling all space between said continuous fiber optical guide and the wall of said bore, said moldable plastic covering exiting each end of said rigid tube to form a strain relief for each optical fiber.

5. A protected fiber optical splice as recited in claim 2 in which said epoxy is urethane.

6. A protected fiber optical splice as recited in claim 4 in which said metal is aluminum.

7. A protected fiber optical splice as recited in claim 4 in which said metal is steel.

8. A protected fiber optical splice as recited in claim 4 in which said metal is Invar.

9. A protected fiber optical splice as recited in claim 5 in which said tube is of metal.

10. A protected fiber optical splice as recited in claim 9 in which said metal is aluminum.

11. A protected fiber optical splice as recited in claim 9 in which said metal is steel.

12. A protected fiber optical splice as recited in claim 9 in said metal is Invar.

13. A method for forming a protected fiber optical splice comprising the steps of:
    forming a fiber optical splice between at least two optical fibers;
    surrounding said splice and adjacent portions of said fibers with a rigid tube with said splice and fibers substantially centered between the ends of said tube;
    injecting a plastic material into said tube, substantially surrounding said splice and its adjacent said fibers, filling substantially all of the volume between said fibers and the interior wall of said tube, said plastic material being guided to extend beyond the ends of said tube to form a strain relief between said tube and the corresponding fiber exiting the tube; and
    curing said plastic material.

14. A method as recited in claim 13 wherein said tube is of a metal.

15. A method as recited in claim 13 wherein said tube is of aluminum.

16. A method as recited in claim 13 wherein said tube is of steel.

17. A method as recited in claim 13 wherein said tube is of Invar.

18. A method as recited in claim 13 wherein said plastic material is a urethane material.

19. A method as recited in claim 13 and further comprising first and second molding fixtures surrounding said optical fibers and the first and second ends of said tube to direct uncured plastic into said tube and to form cured plastic coverings for said fibers extending from said tube along said fibers;

and said plastic is cured within said fixtures and said tube.

20. A method as recited in claim 18 wherein said tube is of a metal.

21. A method as recited in claim 18 wherein said tube is of aluminum.

22. A method as recited in claim 18 wherein said tube is of steel.

23. The method as recited in claim 18 wherein said tube is of Invar.

24. A method as recited in claim 19 wherein said molding fixtures are split fixtures for removal from said cured plastic coverings.

25. A method as recited in claim 19 wherein the interior of said fixtures mold said coverings to taper from the outside diameter of said tube to a smaller diameter.

26. A method as recited in claim 19 wherein one said molding fixture has an opening for injecting uncured plastic material into said fixture and said tube, and the other said molding fixture has an opening for removing air displaced by said injected plastic material.

* * * * *